(12) United States Patent
Somerville et al.

(10) Patent No.: US 10,222,193 B2
(45) Date of Patent: Mar. 5, 2019

(54) METHOD AND APPARATUS FOR INSPECTING WORKPIECES

(71) Applicant: RENISHAW PLC, Gloucestershire (GB)

(72) Inventors: Leo Christopher Somerville, St. Charles, IL (US); Kevyn Barry Jonas, North Somerset (GB)

(73) Assignee: RENISHAW PLC, Wotton-under-Edge (GB)

( * ) Notice: Subject to any disclaimer, the term of this patent is extended or adjusted under 35 U.S.C. 154(b) by 173 days.

(21) Appl. No.: 15/508,291

(22) PCT Filed: Aug. 26, 2015

(86) PCT No.: PCT/GB2015/052471
§ 371 (c)(1),
(2) Date: Mar. 2, 2017

(87) PCT Pub. No.: WO2016/034855
PCT Pub. Date: Mar. 10, 2016

(65) Prior Publication Data
US 2017/0284785 A1 Oct. 5, 2017

Related U.S. Application Data

(60) Provisional application No. 62/044,720, filed on Sep. 2, 2014.

(51) Int. Cl.
*G01B 5/008* (2006.01)
*G01B 21/04* (2006.01)

(52) U.S. Cl.
CPC .......... *G01B 5/008* (2013.01); *G01B 21/042* (2013.01)

(58) Field of Classification Search
CPC .............................. G01B 5/008; G01B 21/042
USPC ........................................ 33/1 BB, 502, 503
See application file for complete search history.

(56) References Cited

U.S. PATENT DOCUMENTS

| | | |
|---|---|---|
| 5,257,460 A | 11/1993 | McMurtry |
| 5,426,861 A | 6/1995 | Shelton |
| 5,594,668 A | 1/1997 | Bernhardt et al. |
| 5,813,287 A | 9/1998 | McMurtry et al. |
| 5,895,442 A | 4/1999 | Arndt |
| 7,079,969 B2 | 7/2006 | Taylor et al. |

(Continued)

OTHER PUBLICATIONS

Oct. 28, 2015 International Search Report issued in Patent Application No. PCT/GB2015/052471.

(Continued)

*Primary Examiner* — G. Bradley Bennett
(74) *Attorney, Agent, or Firm* — Oliff PLC

(57) ABSTRACT

A series of nominally identical production workpieces are measured on a workshop coordinate measuring apparatus. They are corrected using correction values generated by comparing coordinate values of a reference workpiece measured on the workshop apparatus with corresponding values derived from external measurements. To reduce the care and skill required, the external measurements are used to determine reference values of a geometric property of a feature of the reference workpiece, rather than coordinate values corresponding directly to those made on the workshop apparatus. Corresponding coordinate values are then generated from knowledge of the perfect form of the feature of the reference workpiece.

17 Claims, 5 Drawing Sheets

(56) References Cited

U.S. PATENT DOCUMENTS

| | | | |
|---|---|---|---|
| 7,241,070 B2 | 7/2007 | McMurtry | |
| 2004/0244464 A1 | 12/2004 | Hajdukiewicz et al. | |
| 2009/0307915 A1* | 12/2009 | Sutherland | G01B 21/042 33/502 |
| 2009/0307916 A1* | 12/2009 | McLean | G01B 21/04 33/503 |
| 2012/0317826 A1 | 12/2012 | Jonas | |
| 2012/0323345 A1 | 12/2012 | Jonas et al. | |
| 2014/0007441 A1* | 1/2014 | Pettersson | G01B 5/008 33/503 |
| 2015/0285629 A1* | 10/2015 | Ould | G01B 21/04 33/503 |
| 2015/0300808 A1* | 10/2015 | Osaki | G01B 11/24 33/504 |
| 2016/0146589 A1* | 5/2016 | Jonas | G01B 21/045 33/503 |
| 2016/0298959 A1* | 10/2016 | Jonas | G01B 21/042 |
| 2017/0363403 A1* | 12/2017 | Jonas | G01B 5/0014 |

OTHER PUBLICATIONS

Oct. 28, 2015 Written Opinion issued in Patent Application No. PCT/GB2015/052471.

* cited by examiner

US 10,222,193 B2

METHOD AND APPARATUS FOR INSPECTING WORKPIECES

FIELD OF THE INVENTION

This invention relates to measuring apparatus and methods for inspecting the dimensions of workpieces, and more particularly to coordinate measuring apparatus. Coordinate measuring apparatus include, for example, coordinate measuring machines (CMM), machine tools, manual coordinate measuring arms and inspection robots.

DESCRIPTION OF PRIOR ART

It is common practice after workpieces have been produced, to inspect them on a coordinate measuring machine (CMM) having a movable member supporting a probe, which can be driven within a three-dimensional working volume of the machine.

The CMM (or other coordinate measuring apparatus) may be a so-called Cartesian machine, in which the movable member supporting the probe is mounted via three serially-connected carriages which are respectively movable in three orthogonal directions X, Y, Z. Alternatively, it may be a non-Cartesian machine, for example comprising three or six extensible struts which are each connected in parallel between the movable member and a relatively fixed base member or frame. The movement of the movable member (and thus the probe) in the X, Y, Z working volume is then controlled by coordinating the respective extensions of the three or six struts. Examples of non-Cartesian machines are shown in U.S. Pat. No. 5,813,287 (McMurtry et al) and U.S. Pat. No. 7,241,070 (McMurtry).

U.S. Pat. No. 5,426,861 (Shelton) describes a comparative measurement technique, in order to inspect a series of nominally identical workpieces which are produced in a production process. This will be discussed with reference to FIG. 9 of the accompanying drawings.

In step 100, one workpiece is taken from the series, as a reference workpiece. It is measured on an external CMM in a laboratory environment (step 102), producing a reference set of coordinate measurement values of points on the workpiece surface. Then, in step 104, the reference workpiece is measured again on a workshop CMM located in the production environment, which is subject to thermal and other errors. This produces a corresponding set of measured coordinate values of the points on the surface. The two sets of values are compared point by point in step 106, generating a set of measurement correction values (step 108).

During normal production, further workpieces of the series are measured on the workshop CMM (step 110), producing respective sets of measured coordinate values. Then, in step 112, these measured values are corrected using the measurement correction values, and the results are output and/or stored in step 114. The correction values correct for the errors of the workshop machine, particularly those caused by thermal expansion or contraction in the workshop environment.

U.S. Pat. No. 7,079,969 (Taylor et al) describes another comparative measurement technique of the type shown in FIG. 9. It compares measurements made on a more accurate CMM with measurements made on a less accurate CMM, generating an error map or error function between them. In particular, it enables production workpieces to be measured at a faster speed than the reference measurement on the more accurate CMM, and corrects for resulting dynamic errors. The Taylor patent suggests that the dimensions and form of a workpiece may be calibrated. In practice, as in the Shelton patent, this is done by comparing sets of coordinate measurement values taken on each CMM, point by point.

In the Shelton and Taylor techniques shown in FIG. 9, the external measurement step 102 needs to produce a set of coordinate values, which are then compared point by point with the corresponding values measured on the workshop CMM in step 104. Thus, the external measurement also has to be performed on a coordinate measuring apparatus such as a CMM. It also requires that the user should take care that the locations of the points measured externally (step 102) do indeed correspond to the locations of the points which will subsequently be measured on the workshop CMM (step 104). A problem exists that this requires skill on the part of the user.

A further comparative measurement technique is shown in U.S. Patent Application Publication No. US 2012/0317826 (Jonas). This will be discussed with reference to the accompanying FIG. 10.

Again, one workpiece is taken from the series of nominally identical production workpieces, and used as a reference workpiece (step 120). In step 122, it is measured externally of a workshop CMM used in the production process. This determines a reference value of a geometrical property of a feature of the workpiece (step 124). The geometrical property may for example be a radius or diameter of the feature, or a property such as an angle between two features.

In step 126, the reference workpiece is measured on the workshop CMM, producing a set of measured coordinate values of points on the workpiece surface. These are used in step 128, to determine a measured value of the above geometric property. This is compared with the reference value in step 130, generating a correction value for that geometric property of the workpiece feature (step 132). It should be noted that this comparison of a geometric property value is distinguished from the point-by-point comparison of the Shelton and Taylor patents (FIG. 9).

During normal production, further workpieces of the series are measured on the workshop CMM (step 134), producing respective sets of measured coordinate values. These are used in step 136, to determine a measured value of the above geometric property. Then, in step 138, this measured value is corrected using the feature property correction value from step 132, and the result is output and/or stored in step 140.

The technique of the Jonas patent application (FIG. 10) has an advantage over the Shelton and Taylor techniques (FIG. 9), because it is not essential to use an external coordinate measuring apparatus such as a CMM. Although an external CMM is described as an example, other examples such as callipers or other hand gauges could be used instead. Even using an external CMM, it does not require a skilled user to take care that the locations of externally measured points correspond to the locations of the points which will be measured on the workshop CMM. However, there is a problem that the output is less detailed, since it only outputs a corrected value for the geometrical property of the feature. It cannot be used to inspect the detailed form of a workpiece feature.

SUMMARY OF THE INVENTION

According to the present invention, a method of operating a coordinate measuring apparatus comprises:
  taking a reference workpiece which is one of a series of
    nominally identical workpieces to be inspected, the reference workpiece having at least one feature having a shape associated therewith, using the coordinate measuring apparatus to measure said feature of the reference workpiece at a plurality of measurement points, producing a set of measured coordinate values, and generating a set of measurement correction values associated with respective values in the set of measured coordinate values, characterised in that:

the shape associated with the feature is known not to deviate substantially from a perfect form, a value defining a size, position or orientation of the shape associated with the feature is known from measurement of the feature externally of the coordinate measuring apparatus, and the measurement correction values are generated from the measured coordinate values, from the known value of the size, position or orientation of the shape associated with the feature, and from the fact that the shape is known not to deviate substantially from the perfect form.

In a preferred embodiment of the invention, the method includes using the coordinate measuring apparatus to measure one of more further workpieces of the series, producing measured values of the one or more further workpieces; and correcting the measured values of the one or more further workpieces using the correction values or an error map or error function formed or derived from the correction values.

It may be known that the shape associated with the feature of the reference workpiece does not deviate substantially from a perfect form by measuring it externally of the coordinate measuring apparatus, for example on an external coordinate measuring machine. However, it should be noted that it is not required to transfer detailed measurement data from such an external CMM to the coordinate measuring apparatus. Coordinate values lying on the known perfect form may be generated from the size, position or orientation of the shape associated with the feature.

Thus, in some embodiments of the invention, it is possible to generate a set of measurement correction values, for the correction of corresponding measured points on a workpiece, without the need for external measurement of a full set of corresponding points on the reference workpiece. In other embodiments, even if such a set of points on the reference workpiece is measured externally, it is not necessary for a skilled user to ensure that their locations correspond to the locations of the points measured on the coordinate measuring apparatus.

BRIEF DESCRIPTION OF THE DRAWINGS

Preferred embodiments of the present invention will now be described with reference to the accompanying drawings, wherein.

DESCRIPTION OF PREFERRED EMBODIMENTS

Figure 1:
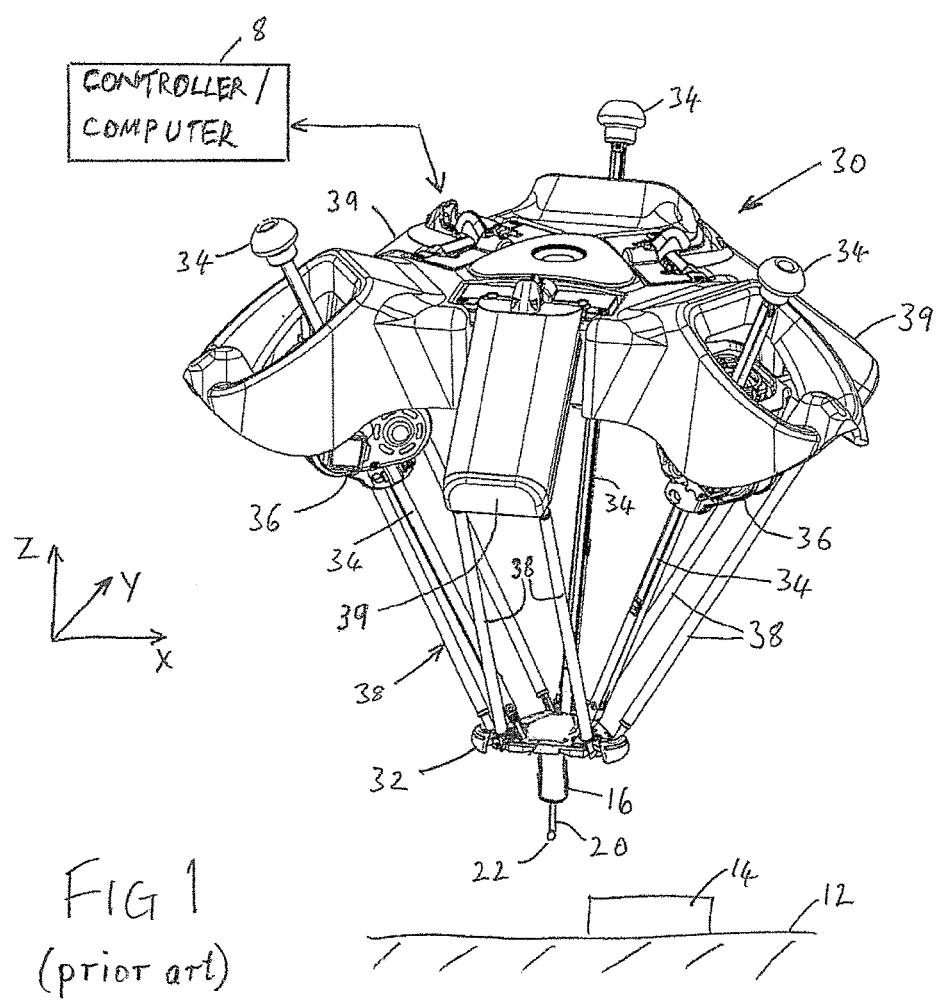
FIG. 1 shows operative parts of a coordinate measuring apparatus.

FIG. 1 is an illustration of parts of a coordinate measuring apparatus. The apparatus is a comparative gauging machine as sold by the present applicants Renishaw plc under the trademark EQUATOR. It comprises a fixed platform 30 connected to a movable platform 32 by a parallel kinematic motion system. In the present example, the parallel kinematic motion system comprises three struts 34 which act in parallel between the fixed and movable platforms. The three struts 34 pass through three respective actuators 36, by which they can be extended and retracted. One end of each strut 34 is mounted by a universally pivotable joint to the movable platform 32, and the actuators 36 are likewise universally pivotably mounted to the fixed platform 30.

The actuators 36 each comprise a motor for extending and retracting the strut, and a transducer which measures the extension of the respective strut 34. In each actuator 36, the transducer may be an encoder comprising a scale and readhead, with a counter for the output of the readhead. Each motor and transducer forms part of a respective servo loop controlled by a controller or computer 8.

The parallel kinematic motion system also comprises three passive anti-rotation devices 38, 39 which also act in parallel between the fixed and movable platforms.

Each anti-rotation device comprises a rigid plate 39 hinged to the fixed platform 30 and a parallel, spaced pair of rods 38 which are universally pivotably connected between the rigid plate 39 and the movable platform 32. The anti-rotation devices cooperate to constrain the movable platform 32 against movement in all three rotational degrees of freedom. Therefore, the movable platform 32 is constrained to move only with three translational degrees of freedom X, Y, Z. By demanding appropriate extensions of the struts 34, the controller/computer 8 can produce any desired X, Y, Z displacement or X, Y, Z positioning of the movable platform.

The principle of operation of such a parallel kinematic motion system is described in our U.S. Pat. No. 5,813,287 (McMurtry et al). It is an example of a tripod mechanism (having the three extending struts 34). Other motion systems e.g. with tripod or hexapod parallel kinematic mechanisms can be used.

Taken together, the transducers of the three actuators form a position measuring system. This determines the X, Y, Z position of the movable platform 32 relative to the fixed platform 30, by appropriate calculations in the controller or computer 8. These calculations are known to the skilled person. Like all measuring apparatus, the position thus determined by the position measuring system is however subject to errors. Methods are discussed below for correcting such errors when using the machine to measure workpieces.

Typically an analogue probe 16 having a deflectable stylus 20 with a workpiece contacting tip 22 is mounted on the movable platform 32 of the machine, although other types of probes (including touch trigger probes) may be used. The machine moves the probe 16 relative to a workpiece 14 on a table 12 in order to carry out measurements of features of the workpiece. The X, Y, Z position of a point on the workpiece surface is derived by calculation from the transducers in the servo system, in conjunction with the outputs of the analogue probe 16. This is all controlled by the controller/computer 8. Alternatively, with a touch trigger probe, a signal indicating that the probe has contacted the surface of the workpiece freezes the X, Y, Z position value calculated from the output from the transducers and the computer takes a reading of the coordinates of the workpiece surface. If desired, automatic means such as a robot (not shown) may place each of a succession of substantially identical workpieces from a production run in at least nominally the same position and orientation on the table.

The machine of FIG. 1 is only an example of the type of measuring machine which can be used in the present invention. Another example is a conventional serial-connected Cartesian CMM. Whichever type of machine is used, typically it is placed in a workshop environment in order to inspect production workpieces from an automated manufacturing process.

Figure 2:
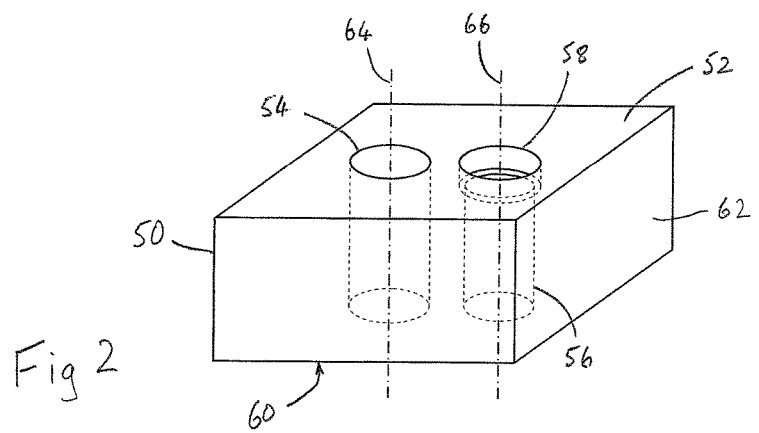
FIG. 2 shows an example of a workpiece to be measured.

FIG. 2 shows an example of a workpiece 50 to be manufactured, in a production process which produces a series of nominally identical workpieces. It is required to inspect these workpieces on the measuring machine of FIG. 1, as they are received from the manufacturing process.

The workpiece 50 includes a number of features which are to be inspected, such as a surface 52 having a flat shape, surfaces such as bores 54, 56 having a circular or cylindrical shape, and a counter-bore 58 of the bore 56 which also has a circular or cylindrical shape. It may also be required to inspect relationships between such features, e.g. the concentricity between the nominally concentric cylinders 56, 58; or the offset between the nominally parallel axes 64, 66 of the bores 54, 56; or the parallelism between the flat surface 52 and a horizontal datum surface 60; or the perpendicularity of the axes 62, 64 with respect to the horizontal datum surface 60; or the angularity or parallelism of those axes with respect to each other or to a vertical datum surface 62.

Figure 8:
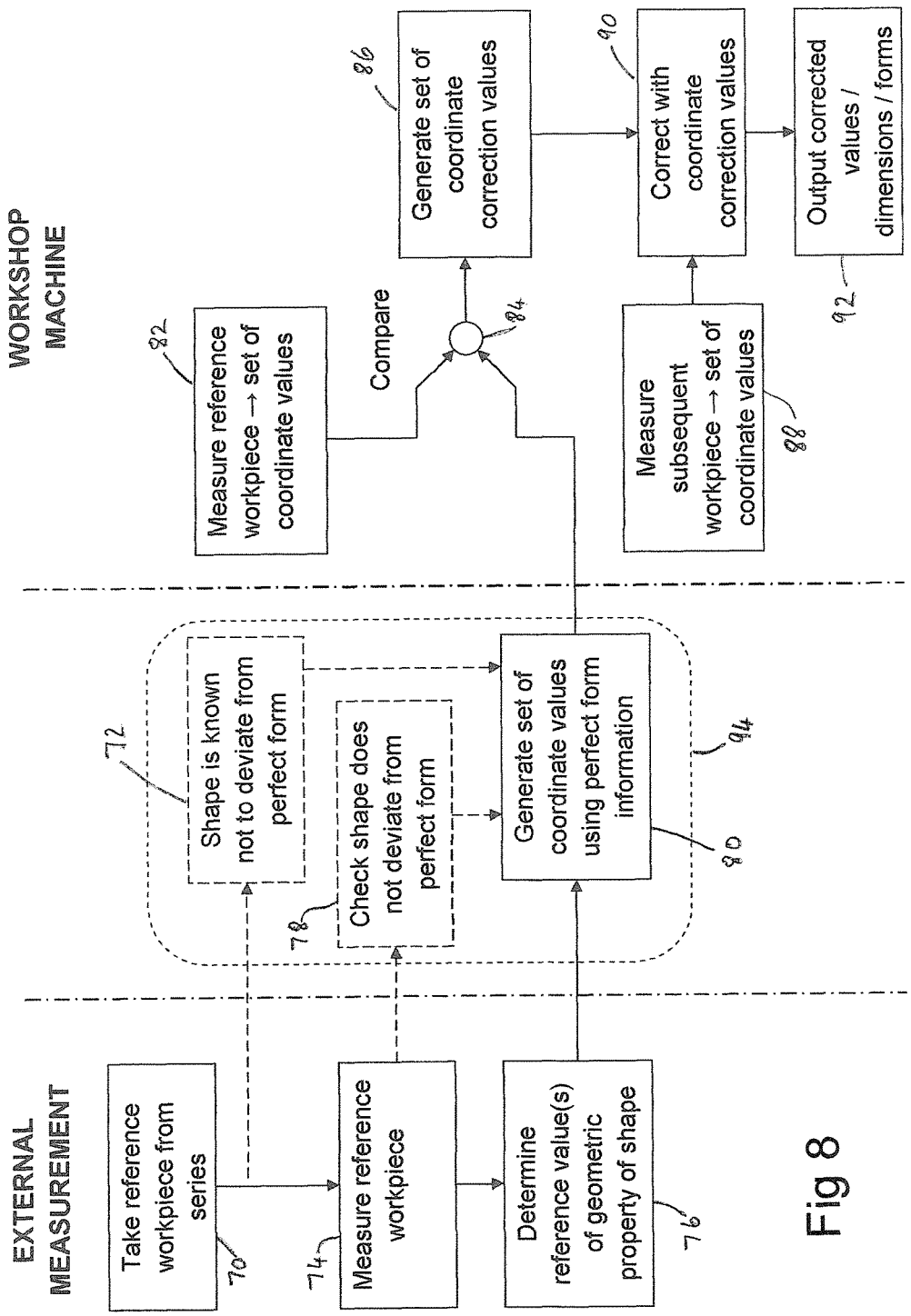
FIG. 8 is a flowchart of a preferred method for measuring workpieces.

The preferred procedure is illustrated in the flowchart of FIG. 8.

In step 70, one of the workpieces 50 from the nominally identical series is taken as a reference workpiece. As described below, it will be used as a reference standard against which other workpieces of the series are compared during their inspection.

The reference workpiece 50 may have been manufactured to a more exacting standard than the rest of the series, to achieve confidence that the shapes of its features 52-62 do not deviate substantially from a perfect form. Or the user may otherwise have confidence that these shapes do not deviate from a perfect form, by more than a tolerance appropriate to the inspection measurements which are to be performed subsequently.

Figure 3:
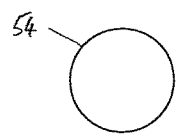
FIGS. 3-7 show features of the workpiece of FIG. 2.
Figure 4:
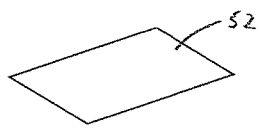

This situation is indicated at 72 in FIG. 8. For example, as illustrated diagrammatically in FIGS. 3 and 4, the cylindrical bore 54 is known to have a substantially circular shape, and the flat surface 52 is known to have a substantially flat form. If the production machine is a machine tool, this may for example be achieved by running the machine tool at a slower cutting speed than would normally be used. Or if the flat surface 52 is normally produced by milling, on the reference workpiece it may be produced more accurately by grinding. Or if the cylindrical bore 54 is normally finish milled using circular interpolation routines in the NC controller of the machine tool to produce a circular path, then on the reference workpiece it may be produced more accurately by reaming. Or the user may simply choose to assume that the reference workpiece complies with its design nominals (i.e. its nominal dimensions as specified in a paper or CAD drawing of the workpiece).

In step 74 of FIG. 8, the reference workpiece 50 is measured externally of the FIG. 1 measuring machine. From this, one or more reference values are determined which define a size and/or position and/or orientation of the features 52-62 (step 76). For example, in the case of the flat surface 52, these may be the X, Y, Z coordinates of a point through which the surface 52 passes, and/or the orientation angles θ, φ of the normal to the surface, all relative to an appropriate datum coordinate measurement system of the workpiece. In the case of the cylindrical bores 54, 56, 58, the measurements may be a radius or diameter of the bore; and/or the X, Y, Z coordinates of one or more points through which their axes 64, 66 pass; and/or the orientation angles θ, φ of the axes 64, 66.

The external measurement of these values may be made manually, using hand instruments such as callipers, micrometer gauges, dial gauges etc. Or for example the external measurement may be performed on a more accurate measuring machine such as a CMM, which may be located in a temperature-controlled laboratory environment. If there is confidence in the circularity (roundness) of a bore 54, 56, 58, then its radius or diameter and the position of its axis in a given measurement plane may be determined from the X, Y, Z coordinates of at least three points around its surface. If there is confidence in the flatness of the surface 52, then its position and its orientation angles θ, φ may be determined by measuring a minimum of three points on the surface. Such measurements may for example be made using routines built in to the software supplied with the CMM.

Step 78 in FIG. 8 illustrates an alternative to step 72, if it is not known in advance (or cannot be assumed) that the shapes of the reference workpiece features do not deviate from their perfect forms. In this case, the shapes of the features 52-62 may be measured in more detail during the external measurement of step 74. Even if the reference workpiece 50 was manufactured to the same standard as the rest of the series (e.g. if it is just a regular workpiece produced during the normal production process), this will check that the shapes do not deviate from their corresponding perfect forms, within a predetermined tolerance. Such a more detailed measurement may be performed on a temperature-controlled CMM in a laboratory environment, which is more accurate than the FIG. 1 machine. Or it may be performed on a dedicated form measuring machine e.g. a roundness measuring machine or a surface profile measuring machine to check flatness. Suitable machines are sold under the trademarks Talyrond and Talysurf by Taylor Hobson Limited, Leicester, United Kingdom.

Figure 5:
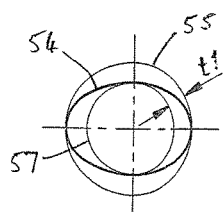
Figure 6:
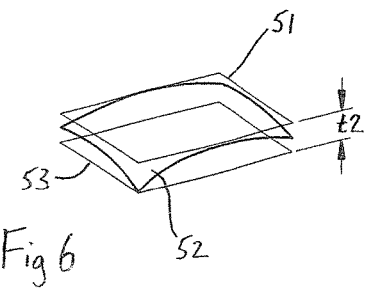

For example, FIG. 5 shows that the circularity (roundness) of the bore 54 conforms to a circular form to within a narrow pre-determined tolerance zone t1. That is, the external measurement shows that in a given plane of measurement, all points on the surface of the bore 54 lie within two notional concentric circles 55, 57, spaced apart by the tolerance t1. Similarly, FIG. 6 shows that the surface 52 conforms to a flat form to within a narrow pre-determined tolerance zone t2. That is, the external measurement shows that all points on the surface 52 lie within two notional parallel planes 51, 53 spaced apart by the tolerance t2. In steps 76 and 78, sufficient points on the reference workpiece 52 are measured to check that the shapes such as 52 and 54 do not deviate from the desired perfect flat or circular form by more than the tolerances t1, t2. During the same measurement procedure, the values which define the size, position and/or orientation values of the shape (e.g. X, Y, Z, θ, φ), are also determined (step 76). (It will be appreciated that FIGS. 5 and 6 show views in which the tolerance zones t1, t2 have been exaggerated for illustration.)

In either of the cases indicated at 72 or 78, we now know that the shapes of the features of the reference workpiece, such as the bore 54 and the surface 52, do not deviate substantially from a perfect circular or flat form (e.g. within the tolerance zones t1, t2). And we have one or more values (e.g. X, Y, Z, θ, φ) which define the size, position or orientation of the shape of the flat or circular surface, as calculated in step 76.

This fact and these values are now used in step 80 to generate a set of coordinate values which lie on the perfect flat or circular form of the surface (e.g. the surfaces 52 or 54). This step may be performed by software running in the computer 8 of the measuring machine of FIG. 1, or in the computer of the more accurate external measuring machine (if any), or in a separate computer. The coordinate values lying on the surface are calculated from the values of the size, position and/or orientation of the surface as determined in step 76, on the assumption indicated at 72 or 78 that the form of the surface is perfect. For example, by assuming a flat surface, and knowing that it passes through the point X, Y, Z at an orientation θ, φ, it is straightforward to calculate a set of coordinate values which all lie on that flat surface. Similarly, assuming a circular form, and knowing the position (and perhaps also the orientation) of its associated axis, it is straightforward to calculate a set of coordinate values which all lie on the circular form.

The locations of these coordinate values generated in step 80 need not correspond to coordinate points measured externally in step 74. Advantageously, they may instead correspond to coordinate points which are to be measured on the workshop machine of FIG. 1. They do not need to correspond to the locations of points which are dictated by measurement routines built into the external CMM or other external measuring apparatus.

In step 82, the reference workpiece 50 is now placed on the workshop measuring machine of FIG. 1. The machine's computer 8 runs a software routine which measures the reference workpiece. For each of the features 52-62, this produces a set of measured coordinate values. The measured values are then compared with the respective generated values, as indicated at 84, to generate a set of respective coordinate measurement correction values as indicated at 86. To facilitate this comparison, as noted above these measured values may be located at locations on the surface which correspond to the values on the perfect form generated in step 80.

When each of the subsequent production workpieces of the series is measured on the FIG. 1 machine, a set of measured coordinate values is produced at measurement points corresponding to the measurement points on the respective features of the reference workpiece (step 88). These are then corrected using the respective measurement correction values (step 90). In step 92, the corrected coordinate values may be output and/or stored in the memory of the machine's computer 8. The corrected coordinate values may also be used to calculate and output and/or store the dimensions and/or form of the features of the measured workpiece.

If the steps 82 and 88 measure the reference workpiece and the production workpieces at substantially the same temperatures in the workshop thermal environment, then the corrected output values will be compensated for any temperature differential between the external laboratory measurement and the workshop measurements. This is as described in U.S. Pat. No. 5,426,861 (Shelton). Furthermore, it is possible to perform the measurements in steps 82 and 88 at the same relatively fast speed, which can be faster than measurements made on the external CMM. The corrected output values will then be compensated for dynamic errors introduced by the fast speed of measurement in comparison to the external measurement. This is as described in U.S. Pat. No. 7,079,969 (Taylor et al).

In step 86, the coordinate correction values may be used as an error map, or an error map or an error function (e.g. a polynomial error function) may be formed or derived from the coordinate correction values. This may then be used for correcting the measurements of subsequent workpieces in step 90.

If the coordinate values of the reference workpiece measured in step 82 are not located at locations on the surface which correspond to the values on the perfect form generated in step 80, then either the generated values are interpolated for comparison with the measured values in step 84, or the measured values are interpolated for comparison with the generated values. Either of these interpolation procedures can be used to generate the set of measurement correction values in step 86.

However, it is preferred simply to generate the values in step 80 at the desired nominal locations, without interpolation. It may be difficult or inconvenient to arrange the workshop measuring machine to take measurements at exactly the same nominal locations, in which case the measured values in step 82 are interpolated. It is likely that such interpolation would need to be repeated for the measured values of each subsequent workpiece of the series in step 88.

FIGS. 3-6 have illustrated that the external measurement steps 74, 76 may determine reference geometric property values (size, position and/or orientation) of a flat surface or a circular feature such as a bore. However, the invention is not limited to such simple features. They can be considered as the most primitive of features, and other more complex features of the reference workpiece may for example be considered as combinations of these. It is also possible to determine reference geometric property values of the shapes of more complex features without breaking them down into primitive circles or flat surfaces.

Figure 7:
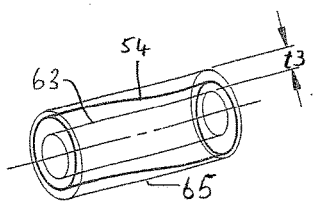

As one example, FIG. 7 illustrates that the cylindricity of one of the bores of the reference workpiece 50 may be checked in step 78, e.g. the bore 54. The external measurement checks that all points on the cylindrical surface of the bore lie between two notional coaxial cylinders 63, 65, spaced apart by a tolerance t3. This could for example be checked by measuring points on the surface of the bore in two or more circles in measurement planes spaced along the axis of the bore. The geometric properties determined in step 76 may be the radius or diameter of the bore, the orientation angles θ, φ of its axis, and the X, Y, Z coordinates of a point on the axis.

The skilled reader will readily appreciate that other more complex features of any workpiece may be checked in a similar manner.

When features of the subsequent workpieces of the production series have been measured, it is then possible to determine relationships between them. For example, referring to FIG. 2, parallelism between the flat surface 52 and the datum surface 60 can be determined. When the positions of the axes 64, 66 of the bores 54, 56 have been determined, it is possible to determine the offset between them. When the orientations of those axes have been determined, it is possible to determine angularity or parallelism between them. For each of those axes, it is possible to determine perpendicularity to the horizontal datum surface 60, or angularity or parallelism with the datum surface 62. Similarly, concentricity between the bore 56 and counter-bore 58 can be determined. Circular run-out may be determined between a circular feature such as a bore and a datum axis. Angularity, squareness, parallelism etc can also be determined between other surfaces of the workpiece.

Figure 10:
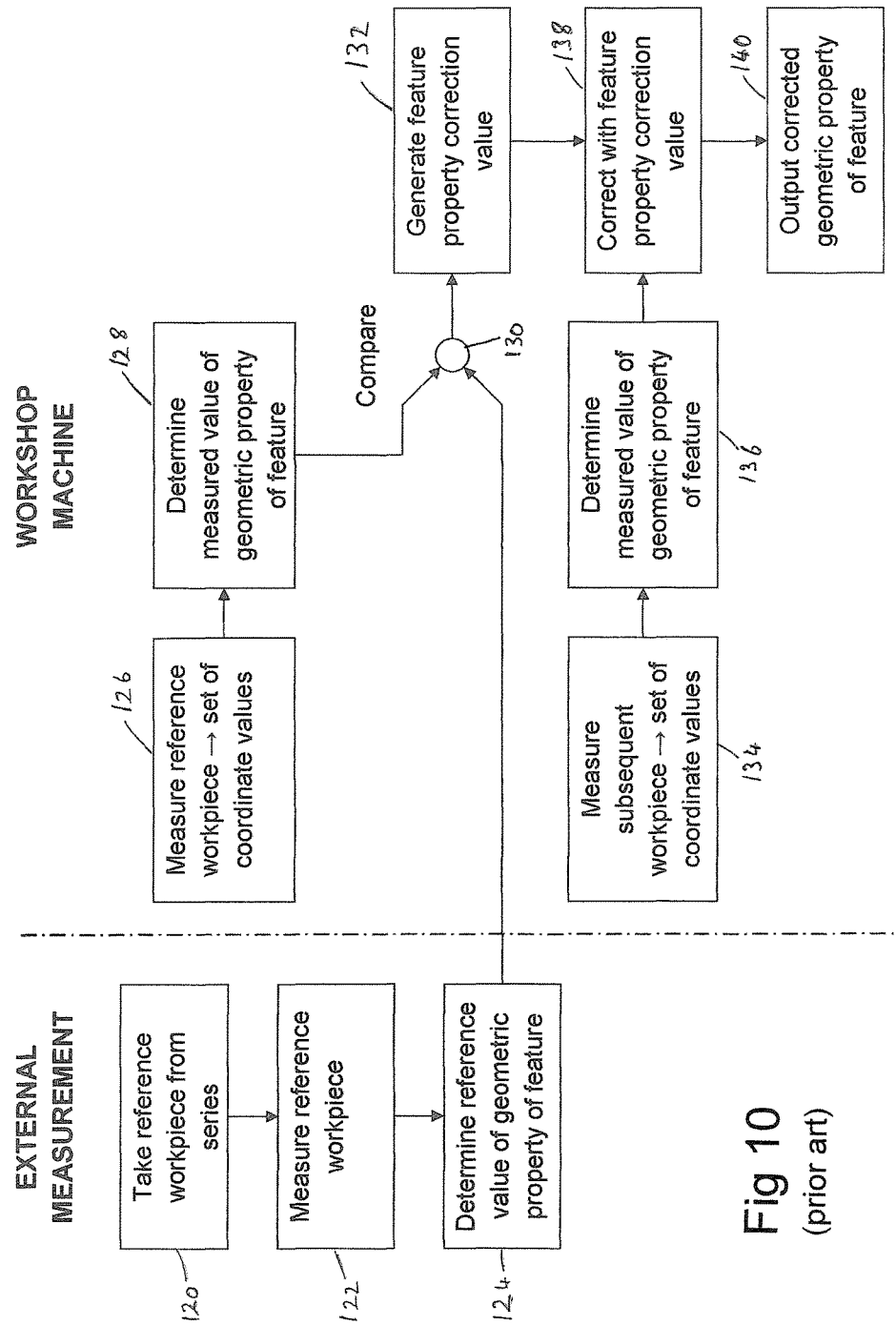

It should be noted that the determination of some of the above relationships, such as circular run-out or cylindricity, requires information about the form of the workpiece features. This is available from the corrected coordinate measurement values in step 90. This is an advantage over the prior art method shown in FIG. 10, which only gives a corrected value of the geometric property of the feature in step 138.

Figure 9:
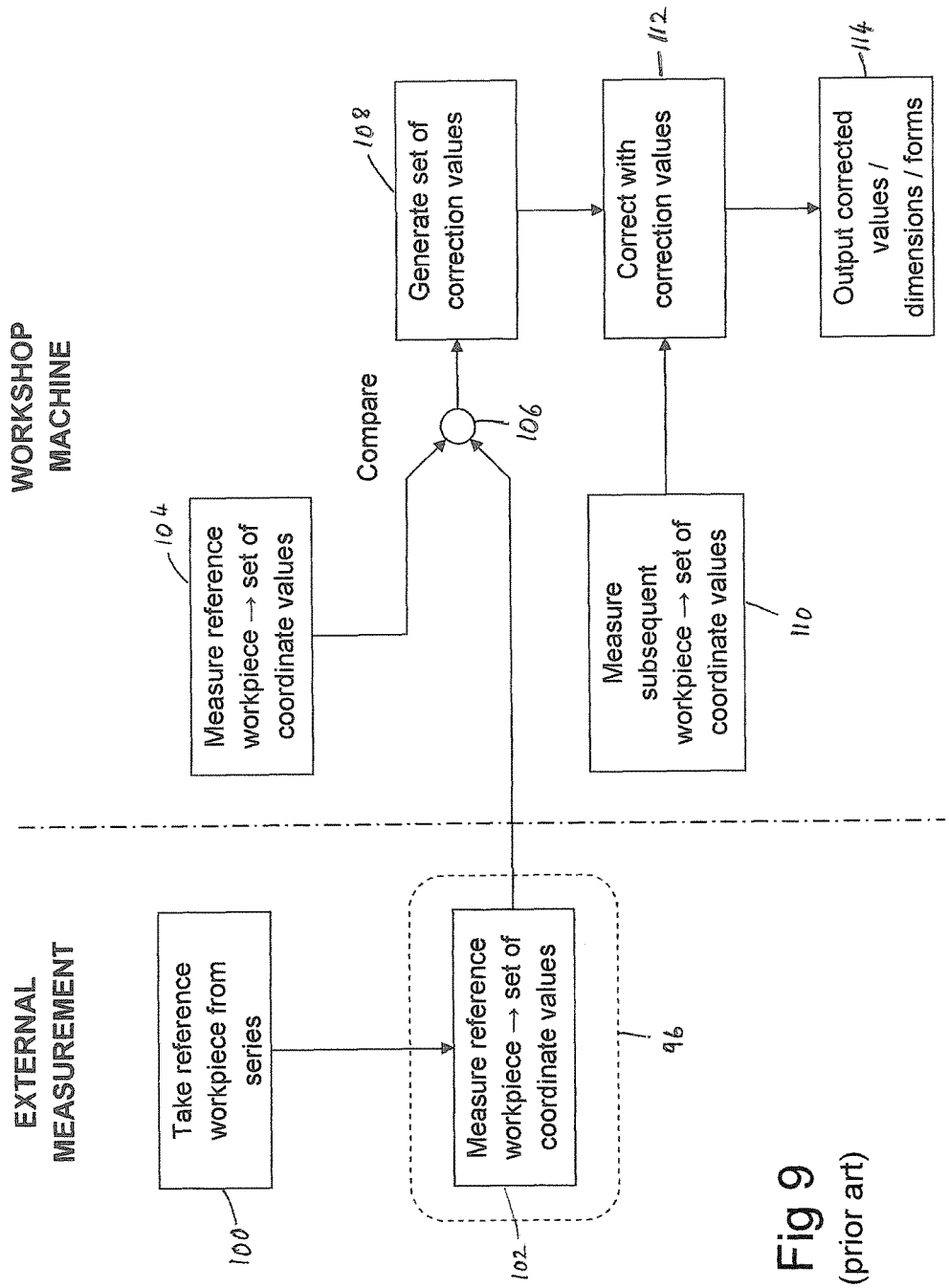
FIGS. 9 and 10 are flowcharts of prior art methods of measuring workpieces.

In FIG. 9, the prior art step 102 is enclosed by a broken line 96. Step 102 measures the reference workpiece externally, to obtain a full set of coordinate values of points on the workpiece surface. The locations of these points must correspond to the points subsequently measured on the workshop machine in steps 104 and 110, to facilitate their comparison.

This may be compared and contrasted with the broken line 94 in FIG. 8, which encloses the steps 72, 78 and 80. In the preferred embodiments of the present invention, these steps automatically generate a full set of coordinate values of points on the reference workpiece surface, rather than measuring them. During the external measurement step 74, it is not necessary for the user to ensure that the coordinate values are taken at the same locations on the reference workpiece as will subsequently be measured on the workshop machine in steps 82 and 88. Instead, coordinate values corresponding to the locations to be measured on the workshop machine can be recreated by the software in step 80. Or interpolation can take place as described above, again without the involvement of the user.

Thus, a practical advantage is that the user only needs to obtain the simple values of the size, position and/or orientation of the surface from the external measurement in steps 74 and 76. This is still true, whether the external measurement in step 74 involves manual measurements, or whether it involves an external CMM which just obtains sufficient coordinate values to determine the reference values for a circular or flat shape, or a computer-controlled CMM which obtains a complete set of coordinate values.

This enables detailed corrected measurements of the workpieces to be output in step 92. The corrected output measurements may for example include a set of coordinate values and information about the form of the workpiece features. They are not restricted only to specific geometric properties such as the radius or angle of a feature, as measured externally in steps 122, 124 of the prior art method shown in FIG. 10.

Another practical advantage is as follows. In the prior art according to FIG. 9, users can experience difficulties when exporting the measured coordinate values from the computer of the external CMM, because they may be in a different format from that accepted by the computer 8 of the workshop machine. The preferred embodiments of the present invention overcome this, since it is only necessary to export the size, position and/or orientation properties and not a full set of measured coordinate values. These can easily be read from a measurement report printed from the external CMM and input manually into the computer 8, if desired.

Furthermore, it has been noted above that if the reference workpiece is produced by an accurate machining process such as reaming, then the form may be assumed to be substantially perfect (step 72). Step 78 then generates a reference set of coordinate values based on that assumption. In the prior art method of U.S. Pat. No. 5,426,861 (Shelton) as shown in FIG. 9, such a substantially perfect workpiece would instead be measured on the external laboratory CMM. This is likely to introduce inaccuracies from the measurement process into the reference set of coordinate values, because an accurate production process such as reaming can produce a circular form which is more accurate than form measurements made by a typical laboratory CMM. Thus, a further advantage of the method of FIG. 8 is that such inaccuracies are reduced, since the external CMM need only measure geometric properties such as size, position or orientation. It does not need to measure a full set of coordinate values representing the form of the workpiece feature.

The calculations in steps 78 and 80 of FIG. 8 may be performed by software which may be resident and run on the computer 8 of the FIG. 1 workshop measuring machine, or on a computer which controls the external CMM (if any), or on some separate computer. Likewise, where appropriate, the knowledge of the perfect form (step 72) may be input to this software. The above practical advantage can be achieved wherever the software runs. Steps 82-92 may be performed by software which is resident and runs on the computer 8 of the FIG. 1 machine. All this software may be pre-installed on the computer 8, or it may be recorded on a machine readable medium, such as a disc or a memory stick or an internet server from which it can be downloaded.

The invention claimed is:

1. A method of operating a coordinate measuring apparatus with a reference workpiece which is one of a series of nominally identical workpieces to be inspected, the reference workpiece having at least one feature having a shape associated therewith, the method comprising:
   using the coordinate measuring apparatus to measure said feature of the reference workpiece at a plurality of measurement points, producing a set of measured coordinate values, and
   generating a set of measurement correction values associated with respective values in the set of measured coordinate values,
   wherein
   the shape associated with the feature is known not to deviate substantially from a perfect form,
   a value defining a size, position or orientation of the shape associated with the feature is known from measurement of the feature externally of the coordinate measuring apparatus, and
   the measurement correction values are generated from the measured coordinate values, from the known value of the size, position or orientation of the shape associated with the feature, and from the fact that the shape is known not to deviate substantially from the perfect form.

2. A method according to claim 1, including using the coordinate measuring apparatus to measure one of more further workpieces of the series, producing measured values of the one or more further workpieces; and correcting the measured values of the one or more further workpieces using the correction values or an error map or error function formed or derived from the correction values.

3. A method according to claim 2, wherein the one or more further workpieces are measured at measurement points corresponding to the measurement points on said feature of the reference workpiece.

4. A method according to claim 2, wherein the one or more further workpieces are measured at substantially the same temperature as the reference workpiece, thereby compensating for a temperature differential between the measurements on the coordinate measuring apparatus and the measurement externally of the coordinate measuring apparatus.

5. A method according to claim 2, wherein the one or more further workpieces are measured at substantially the same speed as the reference workpiece, which is faster than the speed of the measurement externally of the coordinate measuring apparatus.

6. A method according to claim 1, wherein the shape associated with the feature is known not to deviate substantially from a perfect form by measuring it externally of the coordinate measuring apparatus.

7. A method according to claim 1, wherein the shape associated with the feature, and/or the value defining a size, position or orientation of the shape associated with the feature, is known by measurement on an external coordinate measuring machine.

8. A method according to claim 1, wherein coordinate values lying on the known perfect form are generated from the size, position or orientation of the shape associated with the feature.

9. A method according to claim 8, wherein the generated coordinate values are generated at locations on the shape which correspond to the measurement values, for comparison with the measured values.

10. A method according to claim 8, wherein the generated coordinate values are generated at locations on the shape which do not correspond to the measured values, and which are then interpolated for comparison with the measured values, or the measured values are interpolated for comparison with the generated values.

11. A method according to claim 1, wherein the form of the shape comprises a circle.

12. A method according to claim 1, wherein the form of the shape comprises a flat plane.

13. A method according to claim 1, wherein the shape associated with the feature, and/or the value defining a size, position or orientation of the shape associated with the feature, is known by measurement in a temperature-controlled environment.

14. A method according to claim 1, wherein the reference workpiece is manufactured more accurately than other workpieces of the series.

15. A method according to claim 1, wherein the series of nominally identical workpieces comprises production workpieces produced by an automated manufacturing process.

16. A coordinate measuring apparatus having a computer control which is configured to perform a method according to claim 1 with a reference workpiece which is one of a series of nominally identical workpieces to be inspected, the reference workpiece having at least one feature having a shape associated therewith.

17. A computer program which is configured to perform a method according to claim 1 when run on a computer control of a coordinate measuring apparatus with a reference workpiece which is one of a series of nominally identical workpieces to be inspected, the reference workpiece having at least one feature having a shape associated therewith.

* * * * *